(12) United States Patent
Wang et al.

(10) Patent No.: US 10,425,354 B2
(45) Date of Patent: Sep. 24, 2019

(54) RESOURCE ALLOCATION METHOD, PACKET COMMUNICATION METHOD, AND APPARATUS

(71) Applicant: Huawei Technologies Co., Ltd., Shenzhen, Guangdong (CN)

(72) Inventors: Jiao Wang, Beijing (CN); Pengfei Zhang, Shanghai (CN); Xuan Luo, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/294,468

(22) Filed: Oct. 14, 2016

(65) Prior Publication Data
US 2017/0034076 A1    Feb. 2, 2017

Related U.S. Application Data

(63) Continuation of application No. PCT/CN2015/076568, filed on Apr. 14, 2015.

(30) Foreign Application Priority Data

Apr. 17, 2014  (CN) .......................... 2014 1 0155868

(51) Int. Cl.
*H04L 12/911* (2013.01)
*H04L 29/08* (2006.01)
(Continued)

(52) U.S. Cl.
CPC ........ *H04L 47/825* (2013.01); *H04L 12/4633* (2013.01); *H04L 12/4641* (2013.01);
(Continued)

(58) Field of Classification Search
CPC combination set(s) only.
See application file for complete search history.

(56) References Cited

U.S. PATENT DOCUMENTS

| 7,836,168 B1 | 11/2010 | Vasko et al. |
| 8,259,571 B1 | 9/2012 | Raphel et al. |

(Continued)

FOREIGN PATENT DOCUMENTS

| CN | 101188554 A | 5/2008 |
| CN | 102710432 A | 10/2012 |

(Continued)

OTHER PUBLICATIONS

Mahalingam, M., et al. "VXLAN: A Framework for Overlaying Virtualized Layer 2 Networks Over Layer 3 Networks," draft-mahalingam-dutt-dcops-vxlan-09.txt, Oct. 10, 2014, 23 pages.

*Primary Examiner* — Brandon M Renner
*Assistant Examiner* — The Hy Nguyen
(74) *Attorney, Agent, or Firm* — Womble Bond Dickinson (US) LLP

(57) ABSTRACT

Embodiments of the present disclosure provide a resource allocation method, a packet communication method, and an apparatus. The resource allocation method includes: dividing, by a controller, a cloud data center network into multiple independent logical zones; allocating a corresponding tunnel label range to each logical zone; when a virtual network request for allocating a resource to a tenant is received, searching the logical zones to obtain a logical zone that meets the virtual network request; and allocating a tunnel label to the tenant according to a tunnel label range corresponding to the logical zone that meets the virtual network request. Because each logical zone is independent, during tunnel label range allocation, a same tunnel label range can be allocated to different logical zones. In this way, a same tunnel label can be allocated to different switches in different logical zones, implementing reuse of the tunnel label.

10 Claims, 5 Drawing Sheets

(51) Int. Cl.
    *H04L 12/46*    (2006.01)
    *H04L 12/24*    (2006.01)
    *H04L 12/741*   (2013.01)
    *H04L 12/931*   (2013.01)
    *H04L 29/12*    (2006.01)
    *H04L 12/715*   (2013.01)

(52) U.S. Cl.
    CPC .......... *H04L 29/08* (2013.01); *H04L 41/0893* (2013.01); *H04L 41/12* (2013.01); *H04L 45/64* (2013.01); *H04L 45/745* (2013.01); *H04L 49/354* (2013.01); *H04L 61/2592* (2013.01)

(56) References Cited

U.S. PATENT DOCUMENTS

| | | |
|---|---|---|
| 2013/0014101 A1 | 1/2013 | Ballani et al. |
| 2013/0044641 A1 | 2/2013 | Koponen et al. |
| 2013/0185436 A1* | 7/2013 | Carlin .................. G06F 9/5011 709/226 |
| 2014/0201375 A1* | 7/2014 | Beereddy ................ H04L 47/70 709/226 |
| 2016/0285760 A1* | 9/2016 | Dong .................. H04L 12/4666 |

FOREIGN PATENT DOCUMENTS

| | | |
|---|---|---|
| CN | 103024048 A | 4/2013 |
| CN | 103401938 A | 11/2013 |
| CN | 103703724 A | 4/2014 |

\* cited by examiner

US 10,425,354 B2

RESOURCE ALLOCATION METHOD, PACKET COMMUNICATION METHOD, AND APPARATUS

CROSS-REFERENCE TO RELATED APPLICATIONS

This application is a continuation of International Application No. PCT/CN2015/076568, filed on Apr. 14, 2015, which claims priority to Chinese Patent Application No. 201410155868.9, filed on Apr. 17, 2014. The disclosures of the aforementioned applications are hereby incorporated by reference in their entireties.

TECHNICAL FIELD

The present disclosure relates to the field of cloud computing technologies, and in particular, to a resource allocation method, a packet communication method, and an apparatus.

BACKGROUND

Currently, a cloud computing technology is a research hotspot in the network field. In large-scale cloud computing, to allow a tenant to customize a network address has become an irresistible tendency. An operation mode in which service lease and service isolation of multiple users need to be supported in an environment of a cloud data center network is briefly referred to as a multi-tenant application mode. In the multi-tenant application mode, packet forwarding between multiple tenants is completed by using a tunneling technology.

The tunneling technology may be: a virtual local area network (VLAN) isolation technology and a generic routing encapsulation (GRE) tunneling technology.

The VLAN isolation technology is a common technology for service and module division in a conventional cloud data center network, and is used to allocate a VLAN ID to each virtual network during cloud computing virtual network isolation. Therefore, a same virtual network is in a layer 2 isolation state. In this case, a tenant may customize IP (Internet Protocol, Internet Protocol) address space of a virtual network of the tenant without worrying collision and overlap with IP address space of another tenant. A main problem of the VLAN isolation technology is: A VLAN ID range is small, and only 4094 independent VLANs are supported.

The GRE tunneling technology is encapsulating a virtual network label for a packet sent by a source host, forwarding the packet to a corresponding destination virtual server, performing decapsulation on the destination virtual server, and identifying a corresponding virtual network, so as to send the packet to a destination host. A virtual network label of the GRE tunneling technology is much longer than a VLAN ID. Therefore, a scale is no longer limited to the quantity 4094. However, in the GRE tunneling technology, different switches each have a unique tunnel label in an entire network, and a tunnel label cannot be reused for different switches.

SUMMARY

In view of this, embodiments of the present disclosure provide a resource allocation method, to divide a cloud data center network into multiple independent logical zones, and allocate an available tunnel label to a virtual network request in an independent logical zone. The embodiments of the present disclosure further provide a packet communication method, to send packets between different logical zones.

The embodiments of the present disclosure further provide a resource allocation apparatus and a packet communication apparatus, to ensure actual implementation and application of the methods. Technical solutions are as follows:

According to a first aspect, an embodiment of the present disclosure provides a resource allocation method, applied to a cloud data center network, where the method includes:

dividing, by a controller, the cloud data center network into multiple independent logical zones;

allocating a corresponding tunnel label range to each of the logical zones;

when a virtual network request for allocating a resource to a tenant is received, searching, by the controller, the logical zones to obtain a logical zone that meets the virtual network request; and allocating a tunnel label to the tenant according to a tunnel label range corresponding to the logical zone that meets the virtual network request.

In a first feasible manner of the first aspect, the dividing the cloud data center network into multiple independent logical zones includes:

searching for a switch connected to physical hosts in the cloud data center network; and putting the switch and the physical hosts connected to the switch into a same logical zone.

With reference to the first feasible manner of the first aspect, in a second feasible manner of the first aspect, the putting the switch and the physical hosts connected to the switch into a same logical zone includes:

obtaining a total quantity of virtual hosts carried by the physical hosts connected to the switch; and if the total quantity of the virtual hosts is greater than a preset host quantity, dividing, according to the preset host quantity, the physical hosts connected to the switch, and putting a physical host after the division and a switch connected to the physical host after the division into a same logical zone, where a total quantity of virtual hosts carried by the physical host after the division is not greater than the preset host quantity; or if the total quantity of the virtual hosts is not greater than a preset host quantity, putting the switch and the physical hosts connected to the switch into a same logical zone.

With reference to the first feasible manner of the first aspect, in a third feasible manner of the first aspect, the putting the switch and the physical hosts connected to the switch into a same logical zone includes: obtaining multiple switches that support a same tunneling technology; and putting the multiple switches that support the same tunneling technology and physical hosts connected to the multiple switches into a same logical zone.

With reference to the first aspect or any feasible manner of the first feasible manner to the third feasible manner of the first aspect, in a fourth feasible manner of the first aspect, the method further includes: configuring a tunneling technology for each of the logical zones according to a configuration rule.

In a fifth feasible manner of the first aspect, when at least two logical zones meet the virtual network request, the allocating a tunnel label to the tenant according to a tunnel label range corresponding to the logical zone that meets the virtual network request includes:

dividing the virtual network request into multiple subrequests according to a quantity of logical zones that meet the virtual network request, where each sub-request is used to request to construct a network segment of a virtual network, and the virtual network is a network constructed for the tenant according to the virtual network request;

allocating a logical zone to each sub-request in the logical zones that meet the virtual network request; and allocating the tunnel label to the tenant according to a tunnel label range corresponding to the logical zone allocated to each sub-request.

According to a second aspect, an embodiment of the present disclosure further provides a packet communication method, applied to a cloud data center network, where the cloud data center network is divided into multiple independent logical zones, and the method includes:

receiving, by a controller, a data packet forwarding request, where the data packet forwarding request carries information about a source host and a destination host;

obtaining, by the controller, a resource label of the source host according to the information about the source host, where the resource label of the source host includes a label of a logical zone in which the source host is located and a tunnel label of the source host;

obtaining, by the controller, a resource label of the destination host according to the information about the destination host, where the resource label of the destination host includes a label of a logical zone in which the destination host is located and a tunnel label of the destination host; and sending, by the controller, the resource label of the source host and the resource label of the destination host to a switch, so that the switch switches the label of the logical zone in which the source host is located to the label of the logical zone in which the destination host is located, and switches the tunnel label of the source host to the tunnel label of the destination host; and sends a data packet after the resource label switching to the destination host.

In a first feasible manner of the second aspect, the method further includes:

obtaining, by the controller according to the information about the source host, a tunneling technology supported by the logical zone in which the source host is located;

obtaining, by the controller according to the information about the destination host, a tunneling technology supported by the logical zone in which the destination host is located; and sending, by the controller to the switch, the tunneling technology supported by the logical zone in which the source host is located and the tunneling technology supported by the logical zone in which the destination host is located, so that the switch switches the tunneling technology supported by the logical zone in which the source host is located to the tunneling technology supported by the logical zone in which the destination host is located.

With reference to the second aspect or the first feasible manner of the second aspect, in a second feasible manner of the second aspect, the switch is a switch in the logical zone in which the source host is located or a switch in the logical zone in which the destination host is located.

With reference to the second aspect or the first feasible manner of the second aspect, in a third feasible manner of the second aspect, the switch includes a switch in the logical zone in which the source host is located and a switch in the logical zone in which the destination host is located, and the switching, by the switch, the label of the logical zone in which the source host is located to the label of the logical zone in which the destination host is located, and switching the tunnel label of the source host to the tunnel label of the destination host includes:

removing, by the switch in the logical zone in which the source host is located, the resource label of the source host from a data packet, and then sending the data packet from which the resource label of the source host has been removed to the switch in the logical zone in which the destination host is located, and loading, by the switch in the logical zone in which the destination host is located, the resource label of the destination host into the data packet from which the resource label of the source host has been removed.

With reference to the first feasible manner of the second aspect, in a fourth feasible manner of the second aspect, the controller obtains, from tenant information according to the information about the source host, the resource label of the source host and the tunneling technology supported by the logical zone in which the source host is located; and obtains, from the tenant information according to the information about the destination host, the resource label of the destination host and the tunneling technology supported by the logical zone in which the destination host is located.

With reference to the fourth feasible manner of the second aspect, in a fifth feasible manner of the second aspect, the tenant information is stored in the controller in a form of a mapping table; or the tenant information is stored in a form of a mapping table in a device independent of the controller, and an information channel for transmitting the mapping table is established between the device and the controller.

With reference to the second aspect or any feasible manner of the first feasible manner, the fourth feasible manner, and the fifth feasible manner of the second aspect, in a sixth feasible manner of the second aspect, the method is applied to division of a cloud data center network into multiple independent logical zones and allocation of a tunnel label range to each of the logical zones after the division in the resource allocation method.

According to a third aspect, an embodiment of the present disclosure provides a resource allocation apparatus, applied to a controller of a cloud data center network, where the apparatus includes:

a division unit, configured to divide the cloud data center network into multiple independent logical zones;

a first allocation unit, configured to allocate a corresponding tunnel label range to each of the logical zones;

an obtaining unit, configured to: when a virtual network request for allocating a resource to a tenant is received, search the logical zones to obtain a logical zone that meets the virtual network request; and a second allocation unit, configured to allocate a tunnel label to the tenant according to a tunnel label range corresponding to the logical zone that meets the virtual network request.

In a first feasible manner of the third aspect, the division unit includes:

a search subunit, configured to search for a switch connected to physical hosts in the cloud data center network; and an allocation subunit, configured to put the switch and the physical hosts connected to the switch into a same logical zone.

With reference to the first feasible manner of the third aspect, in a second feasible manner of the third aspect, the allocation subunit being configured to put the switch and the physical hosts connected to the switch into a same logical zone is specifically:

the allocation subunit being configured to obtain a total quantity of virtual hosts carried by the physical hosts connected to the switch; and in a case in which the total quantity of the virtual hosts is greater than a preset host quantity, divide, according to the preset host quantity, the physical hosts connected to the switch, and put a physical host after the division and a switch connected to the physical host after the division into a same logical zone, where a total quantity of virtual hosts carried by the physical host after the division is not greater than the preset host quantity; or in a case in which the total quantity of the virtual hosts is not greater than a preset host quantity, put the switch and the physical hosts connected to the switch into a same logical zone.

With reference to the first feasible manner of the third aspect, in a third feasible manner of the third aspect, the allocation subunit being configured to put the switch and the physical hosts connected to the switch into a same logical zone includes:

the allocation subunit being configured to obtain multiple switches that support a same tunneling technology; and put the multiple switches that support the same tunneling technology and physical hosts connected to the multiple switches into a same logical zone.

With reference to the third aspect or any feasible manner of the first feasible manner to the third feasible manner of the third aspect, in a fourth feasible manner of the third aspect, the apparatus further includes: a configuration unit, configured to configure a tunneling technology for each of the logical zones according to a configuration rule.

In a fifth feasible manner of the third aspect, the second allocation unit includes:

a division subunit, configured to divide the virtual network request into multiple sub-requests according to a quantity of logical zones that meet the virtual network request, where each sub-request is used to request to construct a network segment of a virtual network, and the virtual network is a network constructed for the tenant according to the virtual network request;

a zone allocation subunit, configured to allocate a logical zone to each sub-request in the logical zones that meet the virtual network request; and a label allocation subunit, configured to allocate the tunnel label to the tenant according to a tunnel label range corresponding to the logical zone allocated to each sub-request.

According to a fourth aspect, an embodiment of the present disclosure further provides a packet communication apparatus, applied to a controller of a cloud data center network, where the cloud data center network is divided into multiple independent logical zones, and the apparatus includes:

a receiving unit, configured to receive a data packet forwarding request, where the data packet forwarding request carries information about a source host and a destination host;

a first obtaining unit, configured to obtain a resource label of the source host according to the information about the source host, where the resource label of the source host includes a label of a logical zone in which the source host is located and a tunnel label of the source host;

a second obtaining unit, configured to obtain a resource label of the destination host according to the information about the destination host, where the resource label of the destination host includes a label of a logical zone in which the destination host is located and a tunnel label of the destination host; and a sending unit, configured to send the resource label of the source host and the resource label of the destination host to a switch, so that the switch switches the label of the logical zone in which the source host is located to the label of the logical zone in which the destination host is located, and switches the tunnel label of the source host to the tunnel label of the destination host; and sends a data packet after the resource label switching to the destination host.

In a first feasible manner of the fourth aspect, the first obtaining unit is further configured to obtain, according to the information about the source host, a tunneling technology supported by the logical zone in which the source host is located; and the second obtaining unit is further configured to obtain, according to the information about the destination host, a tunneling technology supported by the logical zone in which the destination host is located; and the sending unit is further configured to send, to the switch, the tunneling technology supported by the logical zone in which the source host is located and the tunneling technology supported by the logical zone in which the destination host is located, so that the switch switches the tunneling technology supported by the logical zone in which the source host is located to the tunneling technology supported by the logical zone in which the destination host is located.

With reference to the first feasible manner of the fourth aspect, in a second feasible manner of the fourth aspect, the first obtaining unit is configured to obtain, from tenant information according to the information about the source host, the resource label of the source host and the tunneling technology supported by the logical zone in which the source host is located; and the second obtaining unit is configured to obtain, from the tenant information according to the information about the destination host, the resource label of the destination host and the tunneling technology supported by the logical zone in which the destination host is located.

With reference to the second feasible manner of the fourth aspect, in a third feasible manner of the fourth aspect, the tenant information is stored in the controller in a form of a mapping table; or the tenant information is stored in a form of a mapping table in a device independent of the controller, and an information channel for transmitting the mapping table is established between the device and the controller.

With reference to the fourth aspect or any feasible manner of the first feasible manner to the third feasible manner of the fourth aspect, in a fourth feasible manner of the fourth aspect, the apparatus is applied to division of a cloud data center network into multiple independent logical zones and allocation of a tunnel label range to each of the logical zones after the division in the resource allocation apparatus.

Compared with the prior art, the present disclosure has the following advantages:

When the resource allocation method provided in the embodiments of the present disclosure is applied, a controller can divide a cloud data center network into multiple independent logical zones. Because each logical zone is independent, during tunnel label range allocation, a same tunnel label range can be allocated to different logical zones. In this way, during allocation of tunnel labels to switches in different logical zones, a same tunnel label can be allocated to different switches in different logical zones, implementing reuse of the tunnel label.

In addition, based on the cloud data center network after the division, when a virtual network request is received, a tunnel label can be allocated to a tenant in a logical zone of the tenant that meets the virtual network request according to a tunnel label range corresponding to the logical zone of the tenant.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
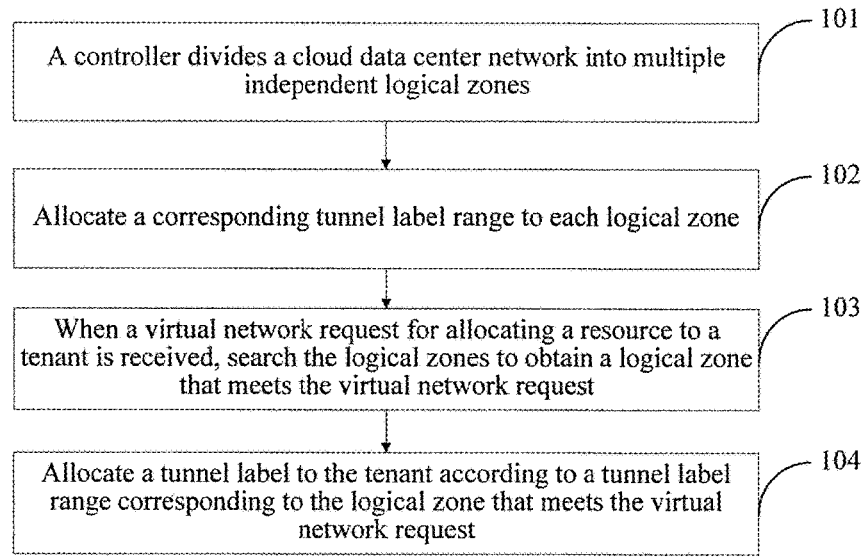
FIG. 1 is a flowchart of a resource allocation method according to an embodiment of the present disclosure.

Referring to FIG. 1, FIG. 1 shows a resource allocation method provided in an embodiment of the present disclosure. The resource allocation method is applied to a cloud data center network, and a controller executes the resource allocation method provided in this embodiment of the present disclosure. The controller may be a controller located in the cloud data center network, or a controller that is located outside the cloud data center network and that is configured to monitor the cloud data center network. The resource allocation method provided in this embodiment of the present disclosure may include the following steps:

101: The controller divides the cloud data center network into multiple independent logical zones.

In this embodiment of the present disclosure, a logical zone is an independent zone obtained after the division of the cloud data center network, and the cloud data center network may be divided according to a network architecture of the cloud data center network. For example, the controller may search for a switch connected to physical hosts in the cloud data center network, and then put the switch and the physical hosts connected to the switch into a same logical zone.

A feasible manner of putting the switch and the physical hosts connected to the switch into a same logical zone is: performing division according to a quantity of switches, and putting each switch and physical hosts connected to each switch into a same logical zone.

Another feasible manner is: first obtaining a total quantity of virtual hosts carried by the physical hosts connected to the switch, and then determining, according to a result of comparison between the total quantity of the virtual hosts and a preset host quantity, how to perform division.

In this embodiment of the present disclosure, a feasible manner of determining, according to a result of comparison between the total quantity of the virtual hosts and a preset host quantity, how to perform division is: if the total quantity of the virtual hosts is greater than the preset host quantity, dividing, according to the preset host quantity, the physical hosts connected to the switch, and putting a physical host after the division and a switch connected to the physical host after the division into a same logical zone; or if the total quantity of the virtual hosts is not greater than the preset host quantity, putting the switch and the physical hosts connected to the switch into a same logical zone.

For example, a switch A is connected to a physical host B, a physical host C, and a physical host D, a quantity of virtual hosts carried by the physical host B is 1024, a quantity of virtual hosts carried by the physical host C is 512, a quantity of virtual hosts carried by the physical host D is 2048, and a preset host quantity is 2048. Therefore, during logical zone division, the controller puts the physical host B, the physical host C, and the switch A into a same logical zone, and puts the physical host D and the switch A into another logical zone. If the preset host quantity is set to 4094, the switch A, the physical host B, physical host C, and the physical host D may be put into a same logical zone.

A physical host is a host connected to each physical port of a switch, a virtual host is obtained by dividing the physical host into multiple virtual hosts, each virtual host may be connected to a virtual port of the switch, and each virtual host has an independent domain name and a complete network server function. The preset host quantity is set according to different network architectures and network requirements.

Figure 2:
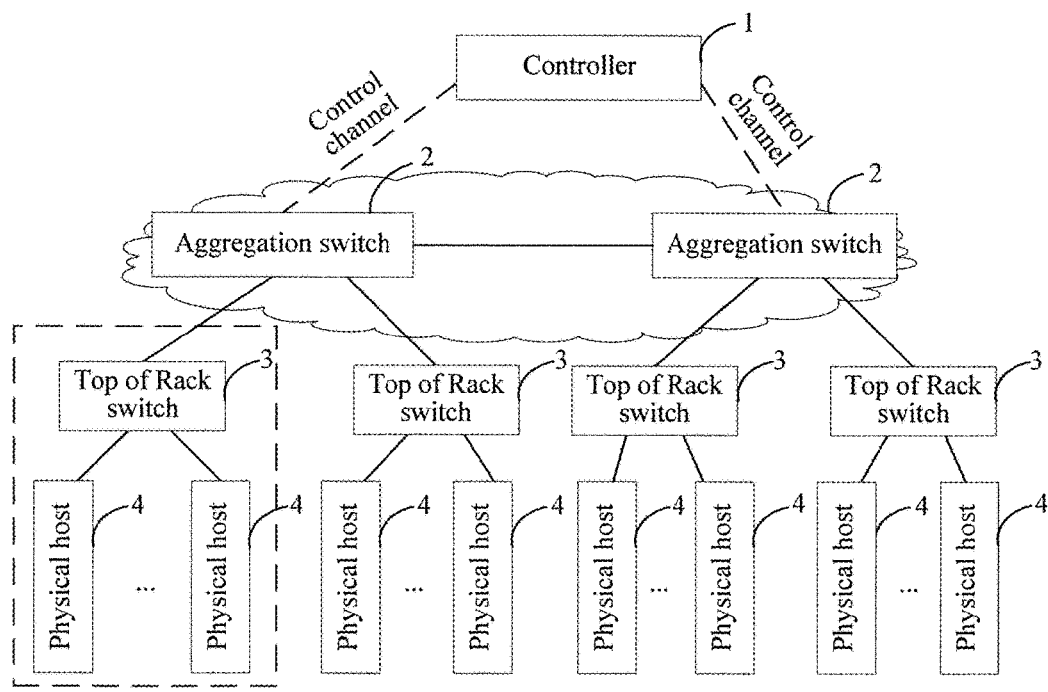
FIG. 2 is a schematic diagram of a network architecture according to an embodiment of the present disclosure.

A description is provided below by using a specific network architecture as an example. As shown in FIG. 2, a cloud data center network includes a controller 1, multiple aggregation switches 2, multiple Top of Rack switches 3, and multiple physical hosts 4, where the controller 1 is connected to the multiple aggregation switches 2, and each aggregation switch 2 is connected to multiple physical hosts 4 by using Top of Rack switches 3.

In the cloud data center network shown in FIG. 2, the physical hosts 4 are not divided into multiple virtual hosts. Therefore, during logical zone division, the controller may put multiple physical hosts 4 connected to each Top of Rack switch 3 into a logical zone, as shown in a dashed block shown in FIG. 2, where a zone represented by the dashed block is an independent logical zone.

Figure 3:
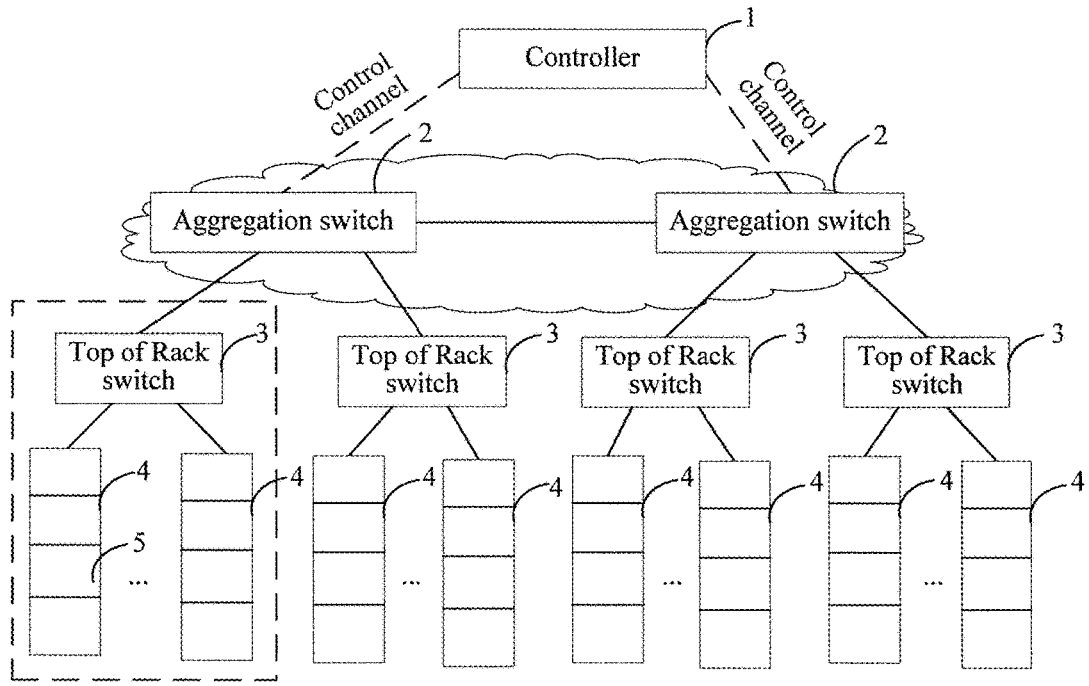
FIG. 3 is a schematic diagram of another network architecture according to an embodiment of the present disclosure.

In an actual network architecture, the physical hosts 4 may be further virtualized. As shown in FIG. 3, each physical host 4 carries multiple virtual hosts 5 (in the figure, each small box represents a virtual host, that is, the physical host is divided into the multiple virtual hosts 5). During logical zone division based on the network architecture shown in FIG. 3, a total quantity of virtual hosts 5 carried by physical hosts 4 connected to a Top of Rack switch 3 may be first obtained, and then the total quantity of the virtual hosts 5 is compared with a preset host quantity, where in the network architecture shown in FIG. 3, the preset host quantity is 1024.

It is found after the comparison that, a total quantity of virtual hosts 5 carried by physical hosts 4 connected to each Top of Rack switch 3 is less than the preset host quantity (for example, 4094). Therefore, the controller 1 uses each Top of Rack switch 3 as a logical zone division reference, and puts the Top of Rack switch 3, the physical hosts 4 connected to the Top of Rack switch 3, and the virtual hosts 5 carried by the physical hosts 4 into a same logical zone, as shown in a dashed block shown in FIG. 3. In addition, it can be seen from FIG. 3 that a total quantity of virtual hosts in each logical zone is not greater than the preset host quantity.

When the switch and the physical hosts connected to the switch are put into a same logical zone, a tunneling technology supported by the switch may be further considered. The controller may put multiple switches that support a same tunneling technology and physical hosts connected to the multiple switches into a same logical zone.

For example, in FIG. 3, if two Top of Rack switches 3 support a same tunneling technology, the controller 1 may put the two Top of Rack switches 3 and multiple physical hosts 4 connected to the two Top of Rack switches 3 into a same logical zone. Therefore, the network architecture shown in FIG. 3 has a logical zone, where the logical zone includes an aggregation switch 2, the Top of Rack switches 3 connected to the aggregation switch 2, the multiple physical hosts 4 connected to the Top of Rack switches 3, and virtual hosts 5 carried by the physical hosts 4.

Certainly, during logical zone division according to a tunneling technology, a total quantity of virtual hosts carried by physical hosts may be further considered. A specific division process may be: first obtaining, by the controller, tunneling technologies supported by switches, and then obtaining a total quantity of virtual hosts carried by physical hosts connected to switches that supports a same tunneling technology; and if the total quantity of the virtual hosts is greater than the preset host quantity, dividing, according to the preset host quantity, the physical hosts connected to the switches, and putting a physical host after the division and a switch connected to the physical host after the division into a same logical zone, where a total quantity of virtual hosts carried by the physical host after the division is not greater than the preset host quantity; or if the total quantity of the virtual hosts is not greater than the preset host quantity, putting the switches and the physical hosts connected to the switches into a same logical zone.

It can be seen from the division manners listed above, in this embodiment of the present disclosure, a main basis of logical zone division is: a border switch in a cloud data center network such as an aggregation switch or a Top of Rack switch is used as a border of a logical zone. A logical zone obtained through division includes a border switch used as a border, and a physical host connected to the border switch, and/or virtual hosts carried by the physical host.

Determining of a border switch is related to a quantity of virtual hosts carried by a physical host in a logical zone. When a Top of Rack switch is used as a border switch, if a total quantity of virtual hosts carried by physical hosts connected to the border switch is not greater than the preset host quantity, the border switch, the physical hosts connected to the border switch, and the virtual hosts carried by the physical hosts are put into a same logical zone.

In another aspect, determining of a border switch may be related to a tunneling technology supported by a logical zone. For example, Top of Rack switches that support a same tunneling technology are put into a same logical zone. Certainly, a total quantity of virtual hosts in the logical zone may be further limited on the basis of supporting the same tunneling technology.

102: Allocate a corresponding tunnel label range to each logical zone.

A tunnel label range is used to represent a quantity range of tunnel labels in a logical zone, and within the quantity range, a tunnel label is allocated by using a port of a switch as a setting basis. A feasible manner is: In a case in which a switch is a soft switch, a physical port of the soft switch is virtualized into multiple virtual ports, a physical host connected to a physical interface is divided into multiple virtual hosts, and each virtual host is connected to a virtual port. Based on the soft switch, the controller allocates a tunnel label to each virtual host, where the soft switch is software having a switch function.

In a case in which a switch is a physical switch, a physical port of the physical switch is connected to a physical host. In this case, the controller allocates a tunnel label to each physical host.

103: When a virtual network request for allocating a resource to a tenant is received, the controller searches the logical zones to obtain a logical zone that meets the virtual network request.

104: Allocate a tunnel label to the tenant according to a tunnel label range corresponding to the logical zone that meets the virtual network request.

In this embodiment of the present disclosure, a virtual network request indicates that a mobile terminal of a tenant needs to access the cloud data center network, and when the cloud data center network receives the virtual network request, a tunnel label further needs to be allocated to the tenant.

It may be understood that, because the tunnel label ranges of the logical zones in the cloud data center network are finite, after the virtual network request is received, the controller first needs to search for a logical zone that can meet the virtual network request.

In this embodiment of the present disclosure, each tunnel resource is marked in a form of a tunnel label. An available tunnel label may be allocated to the tenant during tunnel label allocation. When the available tunnel label is allocated to the tenant, a host corresponding to the available tunnel label is allocated to the tenant. One available tunnel label in one logical zone corresponds to one tenant, and an available tunnel label is a tunnel label that has not been allocated.

An implementation manner may be: determining whether available tunnel labels in a logical zone meet a tenant requirement, and if yes, directly selecting a logical zone that meets the tenant requirement, and allocating an available tunnel label to the tenant according to usage of tunnel labels in the logical zone. Otherwise, allocation of a tunnel label to the tenant needs to be performed in an inter-logical zone manner. An inter-zone tunnel label allocation process is as follows:

first, dividing the virtual network request into multiple sub-requests according to a quantity of logical zones that meet the virtual network request, where each sub-request is used to request to construct a network segment of a virtual network, and the virtual network is a network constructed for the tenant according to the virtual network request; and next, allocating a logical zone to each sub-request in the logical zones that meet the virtual network request; and allocating the tunnel label to the tenant according to a tunnel label range corresponding to the logical zone allocated to each sub-request.

A manner of determining whether a logical zone meets a tenant requirement may be: performing determining according to usage of tunnel labels in the logical zone, where when a quantity of available tunnel labels in the logical zone is within a first quantity, it indicates that the logical zone can meet the tenant requirement. The first quantity is calculated according to a quantity of tunnel labels requested by multiple tenants.

In addition, during allocation of a tunnel label to a tenant, it is first determined whether a tenant corresponding to a mobile terminal that currently sends a virtual network request has been previously allocated a tunnel label, and if yes, a logical zone in which the tenant has been previously allocated a tunnel label is obtained, and a tunnel label is allocated to the tenant in the logical zone again, so that allocation to a same tenant is performed in a same logical zone, and core switching pressure is reduced.

A feasible manner of determining whether a tenant has been previously allocated a tunnel label is: performing determining by obtaining tenant information from configuration information of the controller. Configuration information is used to record information for constructing a virtual network for a tenant in a cloud data center network, and may include but is not limited to: a number of a cloud data center network to which the tenant belongs, a tenant number, a number of a logical zone to which the tenant belongs, information about hosts allocated by logical zones to the tenant, tunneling technologies supported by the logical zones, and tunnel labels corresponding to the logical zones, as shown below:

```
virtualNetwork{
    UUID networkId;
    UUID tenantId;
    virtualNetwork Segment list{
        UUID zoneId;
        port list{
            UUID portId;
            String Mac;
            String IpAddress;
            String devieType;
            UUID deviceOwner;
            UUID switchId;
            ...
        }
        ...
    }
}
``` where networkId is the number of the cloud data center network to which the tenant belongs, tenantId is the tenant number, zoneId is the number of the logical zone to which the tenant belongs, and recorded below port list are the information about the hosts allocated by the logical zones to the tenant, the tunneling technologies supported by the logical zones, and an available tunnel label corresponding to the logical zones.

It should be noted that, the virtual network is constructed by the controller for the tenant according to the virtual network request of the tenant, the configuration information allocated to the tenant is dynamic information, and when the tenant no longer requests to construct the virtual network, the controller clears the configuration information allocated to the tenant, to save memory.

When the resource allocation method provided in this embodiment of the present disclosure is applied, a controller can divide a cloud data center network into multiple independent logical zones. Because each logical zone is independent, during tunnel label range allocation, a same tunnel label range can be allocated to different logical zones. In this way, during allocation of tunnel labels to switches in different logical zones, a same tunnel label can be allocated to different switches in different logical zones, implementing reuse of the tunnel label.

In addition, based on the cloud data center network after the division, when a virtual network request is received, a tunnel label can be allocated to a tenant in a logical zone of the tenant that meets the virtual network request according to a tunnel label range corresponding to the logical zone of the tenant.

Figure 4:
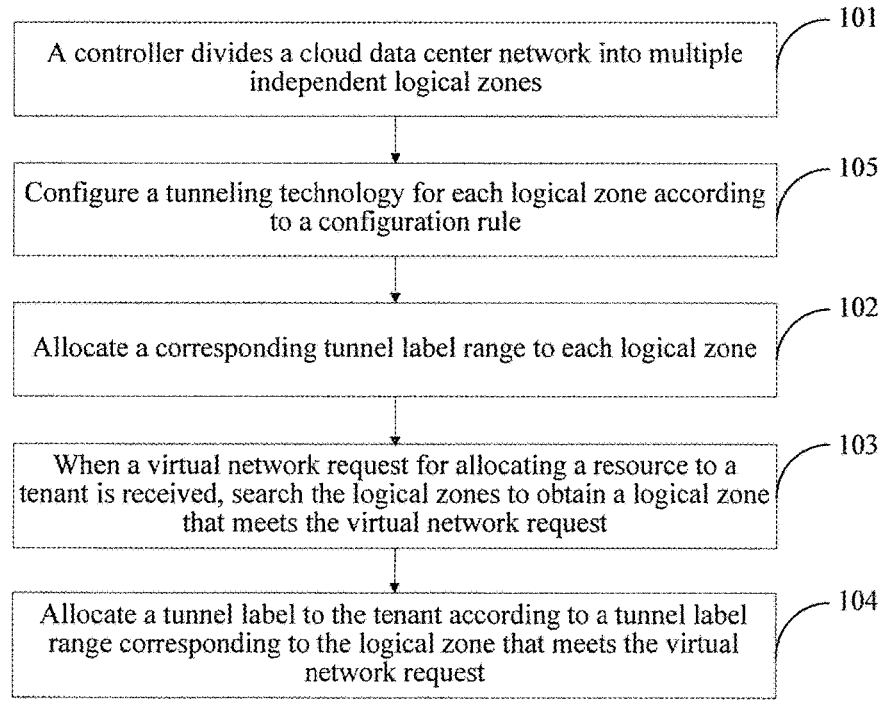
FIG. 4 is another flowchart of a resource allocation method according to an embodiment of the present disclosure.

Moreover, in the foregoing method embodiment, the controller may further configure a tunneling technology for each logical zone. As shown in FIG. 4, based on FIG. 1, the method may further include step 105: Configure a tunneling technology for each logical zone according to a configuration rule.

It may be understood that, the configuration rule is used to indicate the tunneling technology configured for each logical zone. Therefore, during design of the configuration rule, all the logical zones may be allocated different tunneling technologies, so that each tunneling technology is valid only to a logical zone corresponding to the tunneling technology, lowering a limitation to a quantity of physical hosts in the cloud data center network due to a single tunneling technology.

In addition, when each logical zone uses a single tunneling technology, only the tunneling technology needs to be used to isolate a border switch (such as an aggregation switch or a Top of Rack switch) from another logical zone, so that isolation efficiency is high, and compared with use of multiple tunneling technologies, implementation is simple, and pressure on performance is low.

Certainly, during design of the configuration rule, several logical zones may be allocated a same tunneling technology. A configuration rule configuration manner is not limited in this embodiment of the present disclosure.

Figure 5:
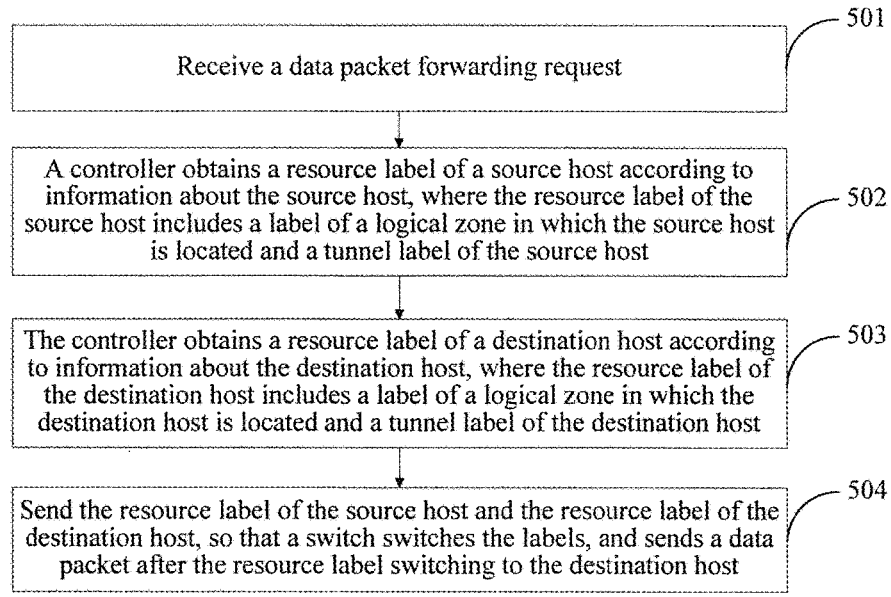
FIG. 5 is a flowchart of a packet communication method according to an embodiment of the present disclosure.

Referring to FIG. 5, FIG. 5 shows a packet communication method provided in an embodiment of the present disclosure. The packet communication method is applied to a cloud data center network, and the cloud data center network is divided into multiple independent logical zones, where for a manner of logical zone division and a manner of resource allocation to a tenant, reference may be made to the flowcharts shown in FIG. 1 to FIG. 4, but the present disclosure is not limited thereto.

The packet communication method provided in this embodiment of the present disclosure is executed by a controller, where data stream communication in different logical zones is described. The method may include the following steps:

501: Receive a data packet forwarding request.

The data packet forwarding request is used to instruct a switch to perform data packet forwarding. Because a source host (sender) and a destination host (receiver) of a data packet are located in different logical zones in the cloud data center network, before the data packet is sent, the controller first needs to obtain, according to information that is about the source host and the destination host and that is carried in the data packet forwarding request, resource labels allocated to the source host and the destination host.

502: The controller obtains a resource label of a source host according to information about the source host, where the resource label of the source host includes a label of a logical zone in which the source host is located and a tunnel label of the source host.

503: The controller obtains a resource label of a destination host according to information about the destination host, where the resource label of the destination host includes a label of a logical zone in which the destination host is located and a tunnel label of the destination host.

In this embodiment of the present disclosure, the information about the source host and the destination host may be information for distinguishing different hosts, and after the controller receives the data packet forwarding request, the controller may obtain the resource labels of the source host and the destination host according to the information for distinguishing different hosts.

For example, the information about the source host and the destination host may be information about logical zones allocated by the controller to the source host and the destination host, such as numbers of the logical zones. Tenant information also includes the numbers of the logical zones. Therefore, the resource labels of the source host and the destination host may be obtained according to the numbers of the logical zones. A specific process may be:

The controller obtains the resource label of the source host from tenant information of the source host according to the information about the source host. Correspondingly, the controller may obtain the resource label of the destination host from tenant information of the destination host according to the information about the destination host.

Tenant information may include but it not limited to: a MAC address and an IP address of a host in a logical zone (the host is determined according to a network architecture, and may be a physical host and/or a virtual host), topology information of the logical zone, a tunneling technology supported by the logical zone, and tunnel labels of the logical zone, as shown in the following code:

```
Zone {
    UNIT32 zoneId;
    String zoneName;
    enum TUNNELTYPE{
        VLAN,
        VxLAN,
        MPLS,
        GRE,
        ...
    }
    Switch list{
        switchId or datapathId,
        ...
    }
    Server list{
        UNIT32 hostId;
        String hostName;
        String Mac;
        String IpAddress;
        ...
    }
}
``` where Zone is the logical zone, zoneId and zoneName is a number of the logical zone and a name of the logical zone, TUNNELTYPE is the tunneling technology supported by the logical zone, Switch list is information about a border switch in the logical zone and the topology information, and Server list is information about the host in the logical zone. Therefore, the resource labels of the source host and the destination host may be obtained from the tenant information.

The tenant information may be stored in the controller in a form of a mapping table. Certainly, the tenant information may be stored in a form of a mapping table in a device independent of the controller, an information channel for transmitting the mapping table is established between the device and the controller, and the controller may search the device for the tenant information by using the information channel.

504: The controller sends the resource label of the source host and the resource label of the destination host to a switch, so that the switch switches the label of the logical zone in which the source host is located to the label of the logical zone in which the destination host is located, and switches the tunnel label of the source host to the tunnel label of the destination host; and sends a data packet after the resource label switching to the destination host.

In a feasible manner of this embodiment of the present disclosure, the controller may send the resource label of the source host and the resource label of the destination host to a switch in the logical zone in which the source host is located, and the switch in the logical zone in which the source host is located switches the label of the logical zone in which the source host is located to the label of the logical zone in which the destination host is located, and switches the tunnel label of the source host to the tunnel label of the destination host.

In another feasible manner of this embodiment of the present disclosure, the controller may send the resource label of the source host and the resource label of the destination host to a switch in the logical zone in which the destination host is located, and the switch in the logical zone in which the destination host is located switches the label of the logical zone in which the source host is located to the label of the logical zone in which the destination host is located, and switches the tunnel label of the source host to the tunnel label of the destination host.

In still another feasible manner of this embodiment of the present disclosure, the controller may send the resource label of the source host to a switch in the logical zone in which the source host is located, and send the resource label of the destination host to a switch in the logical zone in which the destination host is located, the switch in the logical zone in which the source host is located removes the resource label of the source host from a data packet, and then send the data packet from which the resource label of the source host has been removed to the switch in the logical zone in which the destination host is located, and the switch in the logical zone in which the destination host is located loads the resource label of the destination host into the data packet from which the resource label of the source host has been removed.

A process may be: sending, by the controller, the resource label of the source host and a label removal instruction to the switch in the logical zone in which the source host is located, so that after receiving the label removal instruction, the switch in the logical zone in which the source host is located removes the resource label of the source host from the data packet; and sending, by the controller, the resource label of the destination host and a label loading instruction to the switch in the logical zone in which the destination host is located, so that after receiving the label loading instruction, the switch in the logical zone in which the destination host is located loads the resource label of the destination host into the data packet from which the resource label of the source host has been removed.

Moreover, in this embodiment of the present disclosure, the controller may further obtain, according to the information about the source host, a tunneling technology supported by the logical zone in which the source host is located, and obtain, according to the information about the destination host, a tunneling technology supported by the logical zone in which the destination host is located. Then the controller sends, to the switch, the tunneling technology supported by the logical zone in which the source host is located and the tunneling technology supported by the logical zone in which the destination host is located, so that the switch switches the tunneling technology supported by the logical zone in which the source host is located to the tunneling technology supported by the logical zone in which the destination host is located.

It should be noted that, the controller may obtain, from the tenant information of the source host according to the information about the source host, the tunneling technology supported by the logical zone in which the source host is located; and correspondingly, the controller may obtain, from the tenant information of the destination host according to the information about the destination host, the tunneling technology supported by the logical zone in which the destination host is located. Then the controller may send, to the switch in the logical zone in which the source host is located, the tunneling technology supported by the logical zone in which the source host is located and the tunneling technology supported by the logical zone in which the destination host is located, and the switch in the logical zone in which the source host is located switches the tunneling technologies. Certainly, the controller may send the tunneling technologies to the switch in the logical zone in which the destination host is located, and the switch in the logical zone in which the destination host is located switches the tunneling technologies.

Figure 6:
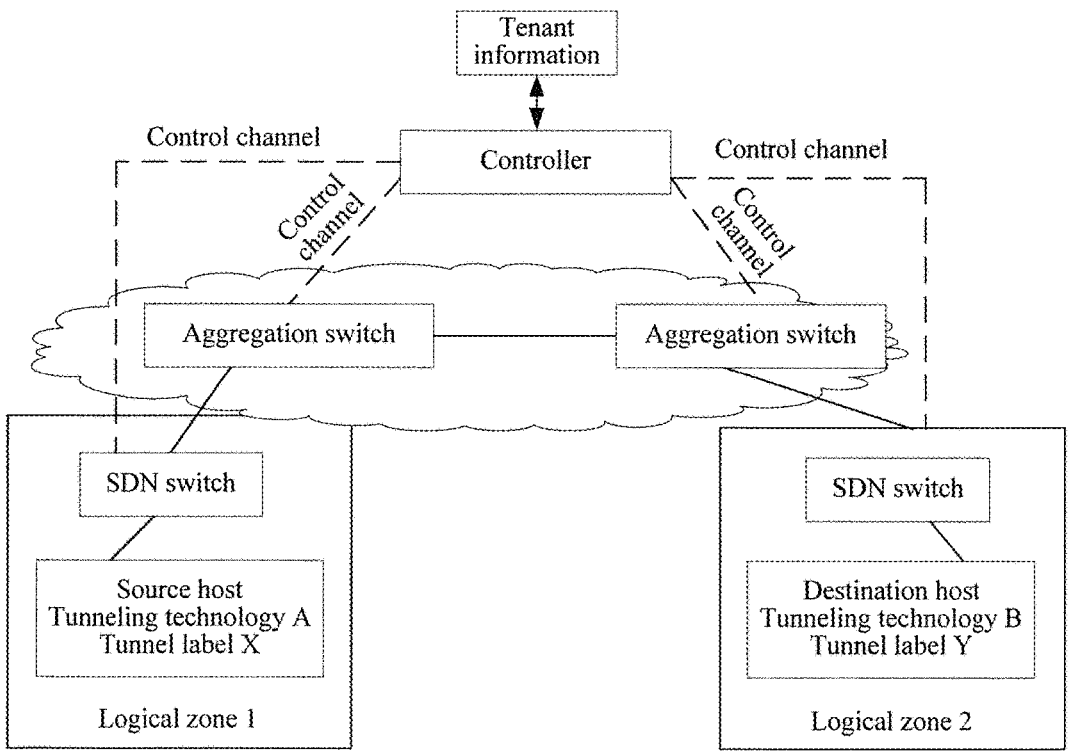
FIG. 6 is a schematic diagram of a packet communication method in a network architecture according to an embodiment of the present disclosure.

The packet communication method provided in this embodiment of the present disclosure is described below by using a specific cloud data center network as an example. A network architecture of the cloud data center network is shown in FIG. 6. The cloud data center network includes a logical zone 1 and a logical zone 2, virtual hosts in the logical zone 1 and the logical zone 2 are connected to software defined network (SDN) switches that support an SDN technology. The SDN switches may be directly connected to a controller, or may be connected to a controller by using border switches. Tenant information is stored in a device independent of the controller.

In the architecture shown in FIG. 6, a source host in the logical zone 1 sends a data packet to a destination host in the logical zone 2, the source host supports a tunneling technology A and is allocated a tunnel label X, and the destination host supports a tunneling technology B and is allocated a tunnel label Y. A packet communication process is as follows:

First, an SDN switch that receives the data packet and that is in the logical zone 1 sends a data packet forwarding request to the controller, where the data packet request carries information about the source host and information about the destination host.

Next, after the data packet forwarding request is received, the controller obtains, according to the logical zone 1 in which the source host of the data packet forwarding request is located and the logical zone 2 in which the destination host of the data packet forwarding request is located, tenant information of the source host and the destination host that is separately recorded by the controller, and separately obtains, from the tenant information, a resource label of the source host and the tunneling technology supported by the source host, and a resource label of the destination host and the tunneling technology supported by the destination host.

Moreover, the controller may further perform path computation according to locations of the SDN switch in the logical zone 1 in which the source host is located and the SDN switch in the logical zone 2 in which the destination host is located, and separately computes a path from a virtual machine to the SDN switch in the logical zone 1, a path from the SDN switch in the logical zone 1 to the SDN switch in the logical zone 2, and a path from the SDN switch in the logical zone 2 to the destination host.

Then the controller may further deliver an operation of removing the tunnel label X of the source host to the SDN switch in the logical zone 1, and deliver an operation of loading the tunnel label Y of the destination host to the SDN switch in the logical zone 2. The SDN switch in the logical zone 1 removes the resource label of the source host from the data packet, and the SDN switch in the logical zone 2 loads the resource label of the destination host into the data packet in which the resource label of the source host has been removed. Certainly, the controller may further send a technology switching instruction to the SDN switch in the logical zone 1 or the SDN switch in the logical zone 2, and the SDN switch switches the tunneling technology supported by the logical zone in which the source host is located to the tunneling technology supported by the logical zone in which the destination host is located.

Finally, the data packet is sent by the SDN switch in the logical zone 1 to the SDN switch in the logical zone 2, and then the SDN switch in the logical zone 2 forwards the data packet to the destination host.

Figure 7:
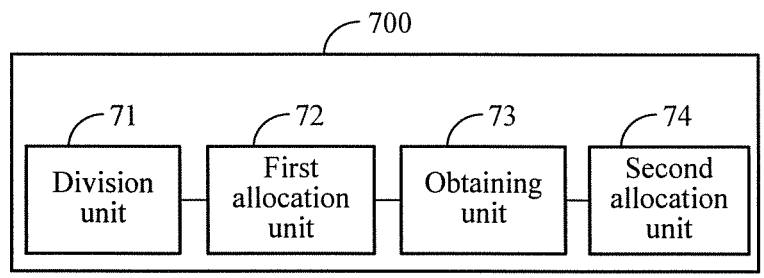
FIG. 7 is a schematic structural diagram of a resource allocation apparatus according to an embodiment of the present disclosure.

Corresponding to the resource allocation method applied to a cloud data center network, an embodiment of the present disclosure further provides a resource allocation apparatus 700, applied to a controller of a cloud data center network. A schematic structural diagram of the apparatus 700 is shown in FIG. 7. The apparatus 700 may include: a division unit 71, a first allocation unit 72, an obtaining unit 73, and a second allocation unit 74.

The division unit 71 is configured to divide the cloud data center network into multiple independent logical zones.

In this embodiment of the present disclosure, a logical zone is an independent zone obtained after the division of the cloud data center network, and the division unit 71 may perform logical zone division according to a network architecture of the cloud data center network.

For example, the division unit 71 includes a search subunit and an allocation subunit, where the search subunit is configured to search for a switch connected to physical hosts in the cloud data center network; and the allocation subunit is configured to put the switch and the physical hosts connected to the switch into a same logical zone, so as to divide the cloud data center network based on the network architecture of the cloud data center network.

A feasible manner of putting the switch and the physical hosts connected to the switch into a same logical zone is: performing, by the allocation subunit, division according to a quantity of switches, and putting each switch and physical hosts connected to each switch into a same logical zone, as shown in FIG. 2.

Another feasible manner is: first obtaining, by the allocation subunit, a total quantity of virtual hosts carried by the physical hosts connected to the switch, and then determining, according to a result of comparison between the total quantity of the virtual hosts and a preset host quantity, how to perform division.

In this embodiment of the present disclosure, for a feasible manner of determining, according to a result of comparison between the total quantity of the virtual hosts and a preset host quantity, how to perform division, reference may be made to FIG. 3. A process may be: if the total quantity of the virtual hosts is greater than the preset host quantity, dividing, according to the preset host quantity, the physical hosts connected to the switch, and putting a physical host after the division and a switch connected to the physical host after the division into a same logical zone; or if the total quantity of the virtual hosts is not greater than the preset host quantity, putting the switch and the physical hosts connected to the switch into a same logical zone.

For example, a switch A is connected to a physical host B, a physical host C, and a physical host D, a quantity of virtual hosts carried by the physical host B is 1024, a quantity of virtual hosts carried by the physical host C is 512, a quantity of virtual hosts carried by the physical host D is 2048, and a preset host quantity is 2048. Therefore, during logical zone division, the allocation subunit puts the physical host B, the physical host C, and the switch A into a same logical zone, and puts the physical host D and the switch A into another logical zone. If the preset host quantity is set to 4094, the switch A, the physical host B, physical host C, and the physical host D may be put into a same logical zone.

A physical host is a host connected to each physical port of a switch, a virtual host is obtained by dividing the physical host into multiple virtual hosts, each virtual host may be connected to a virtual port of the switch, and each virtual host has an independent domain name and a complete network server function. The preset host quantity is set according to different network architectures and network requirements.

When putting the switch and the physical hosts connected to the switch into a same logical zone, the allocation subunit may further consider a tunneling technology supported by the switch. The allocation subunit may put multiple switches that support a same tunneling technology and physical hosts connected to the multiple switches into a same logical zone.

Certainly, during logical zone division according to a tunneling technology, the allocation subunit may further consider a total quantity of virtual hosts carried by physical hosts. A specific division process may be: first obtaining, by the allocation subunit, tunneling technologies supported by switches, and then obtaining a total quantity of virtual hosts carried by physical hosts connected to switches that supports a same tunneling technology; and if the total quantity of the virtual hosts is greater than the preset host quantity, dividing, according to the preset host quantity, the physical hosts connected to the switches, and putting a physical host after the division and a switch connected to the physical host after the division into a same logical zone, where a total quantity of virtual hosts carried by the physical host after the division is not greater than the preset host quantity; or if the total quantity of the virtual hosts is not greater than the preset host quantity, putting the switches and the physical hosts connected to the switches into a same logical zone.

The first allocation unit 72 is configured to allocate a corresponding tunnel label range to each logical zone.

A tunnel label range is used to represent a quantity range of tunnel labels in a logical zone, and within the quantity range, a tunnel label is allocated by using a port of a switch as a setting basis. A feasible manner is: In a case in which a switch is a soft switch, a physical port of the soft switch is virtualized into multiple virtual ports, a physical host connected to a physical interface is divided into multiple virtual hosts, and each virtual host is connected to a virtual port. Based on the soft switch, the controller allocates a tunnel label to each virtual host, where the soft switch is software having a switch function.

In a case in which a switch is a physical switch, a physical port of the physical switch is connected to a physical host. In this case, the controller allocates a tunnel label to each physical host.

The obtaining unit 73 is configured to: when a virtual network request for allocating a resource to a tenant is received, search the logical zones to obtain a logical zone that meets the virtual network request.

The second allocation unit 74 is configured to allocate a tunnel label to the tenant according to a tunnel label range corresponding to the logical zone that meets the virtual network request.

In this embodiment of the present disclosure, a virtual network request indicates that a mobile terminal of a tenant needs to access the cloud data center network, and when the cloud data center network receives the virtual network request, a tunnel label further needs to be allocated to the tenant.

It may be understood that, because the tunnel label ranges of the logical zones in the cloud data center network are finite, after the virtual network request is received, the obtaining unit 73 first needs to search for a logical zone that can meet the virtual network request.

In this embodiment of the present disclosure, each tunnel resource is marked in a form of a tunnel label. The second allocation unit 74 may allocate an available tunnel label to the tenant during tunnel label allocation. When the available tunnel label is allocated to the tenant, a host corresponding to the available tunnel label is allocated to the tenant. One available tunnel label in one logical zone corresponds to one tenant, and an available tunnel label is a tunnel label that has not been allocated.

An implementation manner may be: determining, by the second allocation unit 73, whether available tunnel labels in a logical zone meet a tenant requirement, and if yes, directly selecting a logical zone that meets the tenant requirement, and allocating an available tunnel label to the tenant according to usage of tunnel labels in the logical zone. Otherwise, allocation of a tunnel label to the tenant needs to be performed in an inter-logical zone manner.

Figure 8:
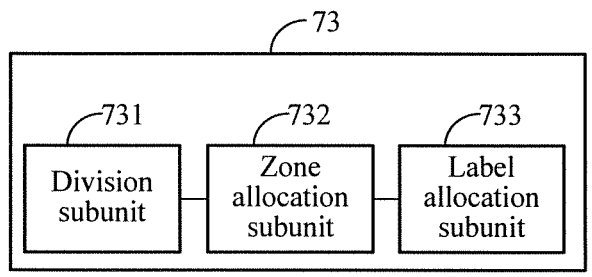
FIG. 8 is a schematic structural diagram of a second allocation unit in a resource allocation apparatus according to an embodiment of the present disclosure.

In this embodiment of the present disclosure, for a schematic structural diagram of the second allocation unit 73, reference may be made to FIG. 8. When configured to implement inter-zone tunnel label allocation, the second allocation unit 73 may include: a division subunit 731, a zone allocation subunit 732, and a label allocation subunit 733, where the division subunit 731 is configured to divide the virtual network request into multiple sub-requests according to a quantity of logical zones that meet the virtual network request, where each sub-request is used to request to construct a network segment of a virtual network, and the virtual network is a network constructed for the tenant according to the virtual network request;

the zone allocation subunit 732 is configured to allocate a logical zone to each sub-request in the logical zones that meet the virtual network request; and the label allocation subunit 733 is configured to allocate the tunnel label to the tenant according to a tunnel label range corresponding to the logical zone allocated to each sub-request.

In this embodiment of the present disclosure, a manner of determining whether a logical zone meets a tenant requirement may be: performing determining according to usage of tunnel labels in the logical zone, where when a quantity of available tunnel labels in the logical zone is within a first quantity, it indicates that the logical zone can meet the tenant requirement. The first quantity is calculated according to a quantity of tunnel labels requested by multiple tenants.

In addition, during allocation of a tunnel label to a tenant, it is first determined whether a tenant corresponding to a mobile terminal that currently sends a virtual network request has been previously allocated a tunnel label, and if yes, a logical zone in which the tenant has been previously allocated a tunnel label is obtained, and a tunnel label is allocated to the tenant in the logical zone again, so that allocation to a same tenant is performed in a same logical zone, and core switching pressure is reduced. For a feasible manner of determining whether a tenant has been previously allocated a tunnel label, reference may be made to a related description in the method embodiment. Details are not described herein again.

When the resource allocation apparatus provided in this embodiment of the present disclosure is applied, a cloud data center network can be divided into multiple independent logical zones. Because each logical zone is independent, during tunnel label range allocation, a same tunnel label range can be allocated to different logical zones. In this way, during allocation of tunnel labels to switches in different logical zones, a same tunnel label can be allocated to different switches in different logical zones, implementing reuse of the tunnel label.

In addition, based on the cloud data center network after the division, when a virtual network request is received, a tunnel label can be allocated to a tenant in a logical zone of the tenant that meets the virtual network request according to a tunnel label range corresponding to the logical zone of the tenant.

Figure 9:
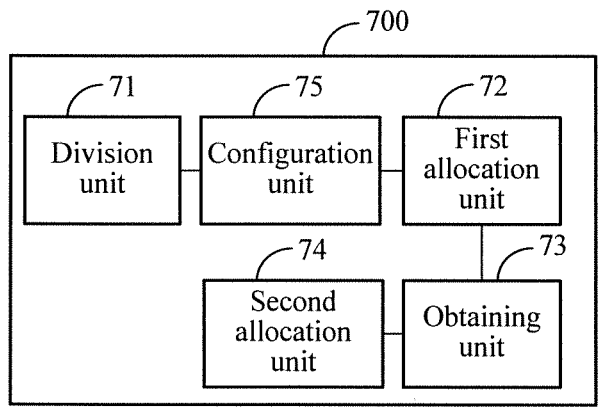
FIG. 9 is another schematic structural diagram of a resource allocation apparatus according to an embodiment of the present disclosure.

Moreover, based on FIG. 7, the resource allocation apparatus 700 provided in this embodiment of the present disclosure may further include: a configuration unit 75, as shown in FIG. 9. The configuration unit 75 is configured to configure a tunneling technology for each logical zone according to a configuration rule.

It may be understood that, the configuration rule is used to indicate the tunneling technology configured for each logical zone. Therefore, during design of the configuration rule, all the logical zones may be allocated different tunneling technologies, so that each tunneling technology is valid only to a logical zone corresponding to the tunneling technology, lowering a limitation to a quantity of physical hosts in the cloud data center network due to a single tunneling technology.

In addition, when each logical zone uses a single tunneling technology, only the tunneling technology needs to be used to isolate a border switch (such as an aggregation switch or a Top of Rack switch) from another logical zone, so that isolation efficiency is high, and compared with use of multiple tunneling technologies, implementation is simple, and pressure on performance is low. Certainly, during design of the configuration rule, several logical zones may be allocated a same tunneling technology. A configuration rule configuration manner is not limited in this embodiment of the present disclosure.

Corresponding to the packet communication method, an embodiment of the present disclosure further provides a packet communication apparatus 800, applied to a controller of a cloud data center network. The cloud data center network is divided into multiple independent logical zones, and the resource allocation apparatus provided in the foregoing embodiment of the present disclosure may be applied to perform logical zone division during division and allocate a tunnel label range to each logical zone after the division.

Figure 10:
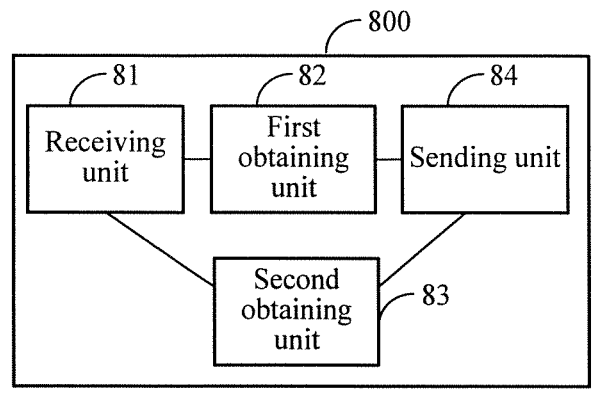
FIG. 10 is a schematic structural diagram of a packet communication apparatus according to an embodiment of the present disclosure.

For a schematic structural diagram of the packet communication apparatus 800 provided in this embodiment of the present disclosure, refer to FIG. 10. The apparatus 800 may include: a receiving unit 81, a first obtaining unit 82, a second obtaining unit 83, and a sending unit 84.

The receiving unit 81 is configured to receive a data packet forwarding request, where the data packet forwarding request carries information about a source host and a destination host.

The data packet forwarding request is used to instruct a switch to perform data packet forwarding. Because a source host (sender) and a destination host (receiver) of a data packet are located in different logical zones in the cloud data center network, before the data packet is sent, the packet communication apparatus first needs to obtain, according to information that is about the source host and the destination host and that is carried in the data packet forwarding request, resource labels allocated to the source host and the destination host.

The first obtaining unit 82 is configured to obtain a resource label of a source host according to information about the source host, where the resource label of the source host includes a label of a logical zone in which the source host is located and a tunnel label of the source host.

The second obtaining unit 83 is configured to obtain a resource label of a destination host according to information about the destination host, where the resource label of the destination host includes a label of a logical zone in which the destination host is located and a tunnel label of the destination host.

In this embodiment of the present disclosure, the information about the source host and the information about the destination host may be information for distinguishing different hosts, and after the data packet forwarding request is received, the first obtaining unit 82 and the second obtaining unit 83 may obtain the resource labels of the source host and the destination host according to the information for distinguishing different hosts.

For example, the information about the source host and the destination host may be information about logical zones allocated by the controller to the source host and the destination host, such as numbers of the logical zones. Tenant information also includes the numbers of the logical zones. Therefore, the resource labels of the source host and the destination host may be obtained according to the numbers of the logical zones. An obtaining process is as follows:

The first obtaining unit 82 obtains the resource label of the source host from tenant information of the source host according to the information about the source host. Correspondingly, the second obtaining unit 83 may obtain the resource label of the destination host from tenant information of the destination host according to the information about the destination host. For a format of the tenant information, reference may be made to a related description in the method embodiment.

The tenant information may be stored in the controller in a form of a mapping table. Certainly, the tenant information may be stored in a form of a mapping table in a device independent of the controller, an information channel for transmitting the mapping table is established between the device and the controller, and the controller may search the device for the tenant information by using the information channel.

The sending unit 84 is configured to send the resource label of the source host and the resource label of the destination host to a switch, so that the switch switches the label of the logical zone in which the source host is located to the label of the logical zone in which the destination host is located, and switches the tunnel label of the source host to the tunnel label of the destination host; and sends a data packet after the resource label switching to the destination host.

In a feasible manner of this embodiment of the present disclosure, the sending unit 84 may send the resource label of the source host and the resource label of the destination host to a switch in the logical zone in which the source host is located, and the switch in the logical zone in which the source host is located switches the label of the logical zone in which the source host is located to the label of the logical zone in which the destination host is located, and switches the tunnel label of the source host to the tunnel label of the destination host.

In another feasible manner of this embodiment of the present disclosure, the sending unit 84 may send the resource label of the source host and the resource label of the destination host to a switch in the logical zone in which the destination host is located, and the switch in the logical zone in which the destination host is located switches the label of the logical zone in which the source host is located to the label of the logical zone in which the destination host is located, and switches the tunnel label of the source host to the tunnel label of the destination host.

In still another feasible manner of this embodiment of the present disclosure, the sending unit 84 may send the resource label of the source host to a switch in the logical zone in which the source host is located, and send the resource label of the destination host to a switch in the logical zone in which the destination host is located, the switch in the logical zone in which the source host is located removes the resource label of the source host from a data packet, and then send the data packet from which the resource label of the source host has been removed to the switch in the logical zone in which the destination host is located, and the switch in the logical zone in which the destination host is located loads the resource label of the destination host into the data packet from which the resource label of the source host has been removed.

A process may be: sending, by the sending unit 84, the resource label of the source host and a label removal instruction to the switch in the logical zone in which the source host is located, so that after receiving the label removal instruction, the switch in the logical zone in which the source host is located removes the resource label of the source host from the data packet; and sending, by the sending unit 84, the resource label of the destination host and a label loading instruction to the switch in the logical zone in which the destination host is located, so that after receiving the label loading instruction, the switch in the logical zone in which the destination host is located loads the resource label of the destination host into the data packet from which the resource label of the source host has been removed.

Moreover, in the packet communication apparatus provided in this embodiment of the present disclosure, the first obtaining unit 82 is further configured to obtain, according to the information about the source host, a tunneling technology supported by the logical zone in which the source host is located; and the second obtaining unit 83 is further configured to obtain, according to the information about the destination host, a tunneling technology supported by the logical zone in which the destination host is located.

Specifically, the first obtaining unit 82 may obtain, from the tenant information of the source host according to the information about the source host, the tunneling technology supported by the logical zone in which the source host is located; and the second obtaining unit 83 may obtain, from the tenant information of the destination host according to the information about the destination host, the tunneling technology supported by the logical zone in which the destination host is located.

The sending unit 84 is further configured to send, to the switch, the tunneling technology supported by the logical zone in which the source host is located and the tunneling technology supported by the logical zone in which the destination host is located, so that the switch switches the tunneling technology supported by the logical zone in which the source host is located to the tunneling technology supported by the logical zone in which the destination host is located.

It should be noted that, the sending unit 84 may send, to the switch in the logical zone in which the source host is located, the tunneling technology supported by the logical zone in which the source host is located and the tunneling technology supported by the logical zone in which the destination host is located, and the switch in the logical zone in which the source host is located switches the tunneling technologies. Certainly, the sending unit 84 may send the tunneling technologies to the switch in the logical zone in which the destination host is located, and the switch in the logical zone in which the destination host is located switches the tunneling technologies.

Figure 11:
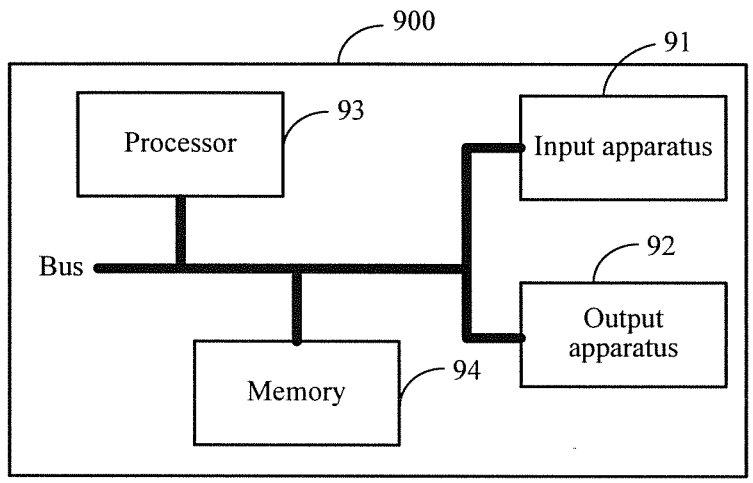
FIG. 11 is a schematic structural diagram of a controller according to an embodiment of the present disclosure.

Corresponding to the resource allocation method and the resource allocation apparatus, an embodiment of the present disclosure further provides a controller 900, as shown in FIG. 11. The controller 900 may include:

an input apparatus 91, an output apparatus 92, a processor 93, and a memory 94 (where there may be one or more processors 93 in the controller 900, and in FIG. 11, one processor 93 is used as an example). In some embodiments of the embodiments of the present disclosure, the input apparatus 91, the output apparatus 92, the processor 93, and the memory 94 may be connected by using a bus or in another manner, where in FIG. 11, being connected by using a bus is used as an example.

The processor 93 is configured to execute a program stored in the memory 94, which may perform the following steps: dividing a cloud data center network into multiple independent logical zones; allocating a corresponding tunnel label range to each logical zone; when a virtual network request for allocating a resource to a tenant is received, searching, by the controller, the logical zones to obtain a logical zone that meets the virtual network request; and allocating a tunnel label to the tenant according to a tunnel label range corresponding to the logical zone that meets the virtual network request.

Figure 12:
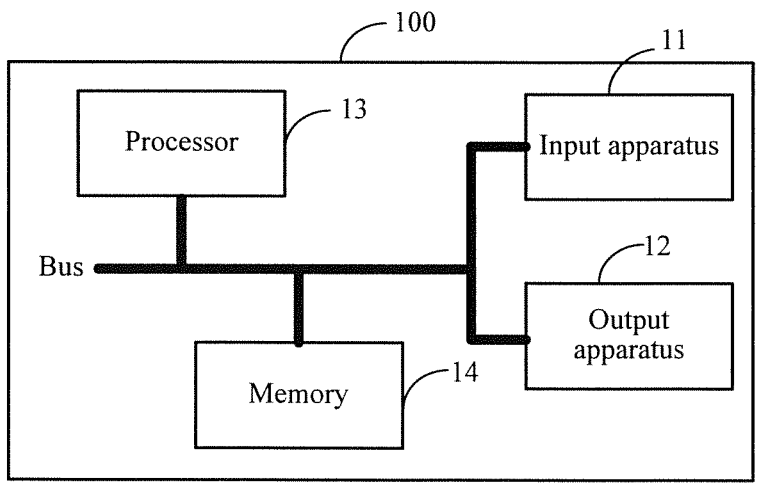
FIG. 12 is a schematic structural diagram of another controller according to an embodiment of the present disclosure.

Corresponding to the packet communication method and the packet communication apparatus, an embodiment of the present disclosure further provides a controller 100, as shown in FIG. 12. The controller 100 may include:

an input apparatus 11, an output apparatus 12, a processor 13, and a memory 14 (where there may be one or more processors 13 in the controller 100, and in FIG. 12, one processor 13 is used as an example). In some embodiments of the embodiments of the present disclosure, the input apparatus 11, the output apparatus 12, the processor 13, and the memory 14 may be connected by using a bus or in another manner, where in FIG. 12, being connected by using a bus is used as an example.

The processor 13 is configured to execute a program stored in the memory 14, and the program may perform the following steps: receiving a data packet forwarding request, where the data packet forwarding request carries information about a source host and a destination host; obtaining a resource label of the source host according to the information about the source host and obtaining a resource label of the destination host according to the information about the destination host; and sending the resource label of the source host and the resource label of the destination host to a switch, so that the switch switches a label of a logical zone in which the source host is located to a label of a logical zone in which the destination host is located, and switches a tunnel label of the source host to a tunnel label of the destination host; and sends a data packet after the resource label switching to the destination host, where the resource label of the source host includes the label of the logical zone in which the source host is located and the tunnel label of the source host, and the resource label of the destination host includes the label of the logical zone in which the destination host is located and the tunnel label of the destination host.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly. For related parts, reference may be made to partial descriptions in the method embodiment.

In the end, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

It may be learned from description of the foregoing implementation manners that, a person skilled in the art may clearly understand that the present disclosure may be implemented by using software in addition to a necessary universal hardware platform. Based on such an understanding, the technical solutions of the present disclosure essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a virtual server, or a network device) to perform the methods described in the embodiments or some parts of the embodiments of the present disclosure.

The resource allocation method, the packet communication method, and the apparatus provided in the embodiments of the present disclosure are described in detail above. Although the principle and implementation manners of the present disclosure are described in this specification by using specific examples, the descriptions of the embodiments are merely intended to help understand the method and core ideas of the present disclosure. In addition, a person of ordinary skill in the art may make modifications to the specific implementation manners and application scopes according to the ideas of the present disclosure. To conclude, the content of the specification shall not be construed as a limitation to the present disclosure.

What is claimed is:

1. A resource allocation method, applied to a cloud data center network, the method comprising:
   dividing, by a controller, the cloud data center network into multiple independent logical zones;
   allocating a corresponding tunnel label range to each of the logical zones;
   when a virtual network request for allocating a resource to a tenant is received, searching, by the controller, the logical zones to obtain one or more logical zones that meet the virtual network request;
   when at least two logical zones meet the virtual network request, dividing the virtual network request into multiple sub-requests according to a quantity of logical zones that meet the virtual network request, wherein each sub-request is for requesting to construct a network segment of a virtual network, wherein the virtual network is constructed for the tenant according to the virtual network request;
   allocating a logical zone to each sub-request in the logical zones that meet the virtual network request; and
   allocating a tunnel label to the tenant according to a tunnel label range corresponding to the logical zone allocated to each sub-request.

2. The method according to claim 1, wherein dividing the cloud data center network into multiple independent logical zones comprises:
   searching for a switch connected to physical hosts in the cloud data center network; and
   putting the switch and the physical hosts connected to the switch into a logical zone.

3. The method according to claim 2, wherein putting the switch and the physical hosts connected to the switch into the logical zone comprises:
   obtaining a total quantity of virtual hosts carried by the physical hosts connected to the switch; and
   if the total quantity of the virtual hosts is greater than a preset host quantity, dividing, according to the preset host quantity, the physical hosts connected to the switch, and putting a physical host after the division and a switch connected to the physical host after the division into the logical zone, wherein a total quantity of virtual hosts carried by the physical host after the division is not greater than the preset host quantity; or if the total quantity of the virtual hosts is not greater than the preset host quantity, putting the switch and the physical hosts connected to the switch into the logical zone.

4. The method according to claim 2, wherein putting the switch and the physical hosts connected to the switch into the logical zone comprises:

obtaining multiple switches that support a same tunneling technology; and putting the multiple switches that support the same tunneling technology and physical hosts connected to the multiple switches into the logical zone.

5. The method according to claim 1, further comprising:
configuring a tunneling technology for each of the logical zones according to a configuration rule.

6. A controller, comprising:
an input apparatus;
an output apparatus;
at least one processor; and
a memory;
wherein the memory comprises instructions that, when executed by the processor, cause the controller to:
divide a cloud data center network into multiple independent logical zones;
allocate a corresponding tunnel label range to each of the logical zones;
when a virtual network request for allocating a resource to a tenant is received, search the logical zones to obtain one or more logical zones that meet the virtual network request;
when at least two logical zones meet the virtual network request, divide the virtual network request into multiple sub-requests according to a quantity of logical zones that meet the virtual network request, wherein each sub-request is for requesting to construct a network segment of a virtual network, wherein the virtual network is constructed for the tenant according to the virtual network request;
allocate a logical zone to each sub-request in the logical zones that meet the virtual network request; and
allocate a tunnel label to the tenant according to a tunnel label range corresponding to the logical zone allocated to each sub-request.

7. The controller according to claim 6, wherein to divide the cloud data center network into multiple independent logical zones, the instructions, when executed by the processor, cause the controller to:

search for a switch connected to physical hosts in the cloud data center network; and put the switch and the physical hosts connected to the switch into a logical zone.

8. The controller according to claim 7, wherein to put the switch and the physical hosts connected to the switch into the logical zone, the instructions, when executed by the processor, cause the controller to:

obtain a total quantity of virtual hosts carried by the physical hosts connected to the switch; and if the total quantity of the virtual hosts is greater than a preset host quantity, divide, according to the preset host quantity, the physical hosts connected to the switch, and put a physical host after the division and a switch connected to the physical host after the division into the logical zone, wherein a total quantity of virtual hosts carried by the physical host after the division is not greater than the preset host quantity; or if the total quantity of the virtual hosts is not greater than the preset host quantity, put the switch and the physical hosts connected to the switch into the logical zone.

9. The controller according to claim 7, wherein to put the switch and the physical hosts connected to the switch into the logical zone, the instructions, when executed by the processor, cause the controller to:

obtain multiple switches that support a same tunneling technology; and put the multiple switches that support the same tunneling technology and physical hosts connected to the multiple switches into the logical zone.

10. The controller according to claim 6, wherein the instructions, when executed by the processor, further cause the controller to:

configure a tunneling technology for each of the logical zones according to a configuration rule.

* * * * *